(12) United States Patent
Pruszenski

(10) Patent No.: US 7,845,085 B2
(45) Date of Patent: Dec. 7, 2010

(54) IDENTIFYING A DIRECTIONAL REFERENCE USING RATE GYROS ORIENTED ALONG DIFFERENT AXES

(75) Inventor: Anthony S. Pruszenski, Georgetown, MA (US)

(73) Assignee: Textron Systems Corporation, Wilmington, MA (US)

( * ) Notice: Subject to any disclaimer, the term of this patent is extended or adjusted under 35 U.S.C. 154(b) by 816 days.

(21) Appl. No.: 11/777,072

(22) Filed: Jul. 12, 2007

(65) Prior Publication Data

US 2010/0024230 A1 Feb. 4, 2010

(51) Int. Cl.
*G01C 19/00* (2006.01)

(52) U.S. Cl. .......................... 33/325; 33/320

(58) Field of Classification Search .................... 33/316, 33/318, 320, 321, 324, 325
See application file for complete search history.

(56) References Cited

U.S. PATENT DOCUMENTS

| | | | |
|---|---|---|---|
| 3,624,365 A * | 11/1971 | Woodworth | 33/328 |
| 3,952,304 A | 4/1976 | Broniwitz et al. | |
| 4,686,771 A | 8/1987 | Beveventano et al. | |
| 5,345,382 A * | 9/1994 | Kao | 33/356 |
| 6,361,507 B1 | 3/2002 | Foxlin | |
| 6,522,992 B1 | 2/2003 | McCall et al. | |
| 6,643,587 B2 | 11/2003 | Brodie et al. | |
| 6,868,314 B1 | 3/2005 | Frink | |
| 7,000,469 B2 | 2/2006 | Foxlin et al. | |
| 7,302,345 B2 * | 11/2007 | Kwon et al. | 33/355 R |
| 2005/0108884 A1 * | 5/2005 | Wang et al. | 33/328 |
| 2009/0287451 A1 * | 11/2009 | Sato et al. | 33/313 |

FOREIGN PATENT DOCUMENTS

WO 2006063432 A1 6/2006

* cited by examiner

*Primary Examiner*—G. Bradley Bennett
(74) *Attorney, Agent, or Firm*—BainwoodHuang

(57) ABSTRACT

A deployable stationary device includes a device support, rate gyros supported by the device support, the rate gyros being oriented along different axes, and a controller supported by the device support. The controller is arranged to receive rate gyro signals from the rate gyros. Each rate gyro signal indicates a rate of rotation about a respective axis associated with a particular rate gyro. The controller is further arranged to perform a vector sum operation based on the rate gyro signals, and generate a direction signal which identifies a direction resulting from performance of the vector summing operation. Such a deployable stationary device is capable of operating as one of a network of such devices in a surveillance system to enable detection and precise location of suspicious activity.

20 Claims, 4 Drawing Sheets

IDENTIFYING A DIRECTIONAL REFERENCE USING RATE GYROS ORIENTED ALONG DIFFERENT AXES

BACKGROUND

Conventional ground sensors typically monitor an area of coverage, and report activity to a central location. Some conventional unmanned ground sensors are constructed so that they can be dropped from the air across a region of potentially hostile activity.

In contrast to manned vehicles which can employ expensive and mechanically complex gyroscopic compasses to facilitate navigation, unmanned ground sensors must be relatively small, durable and reliable since it is unlikely that the unmanned ground sensors individually can be conveniently retrieved and repaired. Rather, such unmanned ground sensors are typically distributed at stationary locations in the field in a sacrificial manner (i.e., with little or no intention of recovering and reusing the ground sensors due to hostile surroundings). Accordingly, such sensors are typically simple, low cost, remotely operational units.

One conventional unmanned ground sensor is equipped with an electronic magnetic compass that enables the ground sensor to determine the direction of the earth's magnetic north pole. The ground sensor is further equipped with a sensor assembly that detects activity in the vicinity of the ground sensor (e.g., general seismic activity, vehicle movement, human activity, etc.). When the ground sensor detects such activity, the ground sensor transmits data conveying the direction of that activity relative to the earth's magnetic north pole.

SUMMARY

Unfortunately, there are deficiencies to the above-described conventional unmanned ground sensor which uses an electronic magnetic compass. For example, electronic magnetic compasses identify the earth's magnetic north pole rather than true north, i.e., the North-South rotational axis of the earth. Accordingly, if the receiver of the magnetic north data from unmanned ground sensor intends to use the information on a map which is based on true north (longitude/latitude), the magnetic north data requires conversion to true north data.

Additionally, electronic magnetic compasses do not work well at higher latitudes. In particular, as one travels closer to the magnetic north pole, the local magnetic field lines (i.e., lines of magnetic flux) become mostly perpendicular to the ground. That is, the vertical (down) can become a much larger component than the horizontal (north) component which is useful for determining the magnetic north direction. For a similar reason, the electronic magnetic compasses are more prone to error if they are not substantially level during operation (i.e., due to decreased ability to measure the horizontal (north) component. As a result, the conventional unmanned ground sensors which use electronic magnetic compasses are error prone to error particularly at higher latitudes and when the compasses are not level.

Furthermore, the electronic magnetic compasses used by the conventional ground sensors are extremely sensitive to environmental influences such as temperature and magnetic interference. For example, field disturbances due to neighboring iron deposits and/or current loops (e.g., from wells, manholes and sewer caps, pipes, buildings, towers, etc.) can easily skew the determined magnetic north direction.

In contrast to the above-described conventional unmanned ground sensors which employ electronic magnetic compasses, an improved technique of identifying a directional reference utilizes rate gyros. The angular rate sensing capabilities of rate gyros make the rate gyros generally insensitive to levelness and magnetic interference. Rather, the rate gyros provide signals along particular sensing axes (X, Y, and Z axes) which, when vector summed, enable identification of the earth's true north direction. As a result, there is no need to convert magnetic north data to true north data. Moreover, influences such as levelness, temperature, local magnetic field disturbances are unlikely to significantly interfere with the operation of the rate gyros.

One embodiment is directed to a deployable stationary device which includes (i) a device support, (ii) rate gyros supported by the device support, the rate gyros being oriented along different axes, and (iii) a controller supported by the device support. The controller is arranged to receive rate gyro signals from the rate gyros. Each rate gyro signal indicates a rate of rotation about a respective axis associated with a particular rate gyro. The controller is further arranged to perform a vector sum operation based on the rate gyro signals, and generate a direction signal which identifies a direction resulting from performance of the vector summing operation. Such a deployable stationary device is capable of operating as one of a network of such devices in a surveillance system to enable detection and precise location of suspicious activity.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of identifying a directional reference utilizes rate gyros. The angular rate sensing capabilities of rate gyros generally make the rate gyros insensitive to levelness and magnetic interference. Rather, the rate gyros provide signals along particular sensing axes (X, Y, and Z axes) which, when vector summed, enable identification of the earth's true north direction. Accordingly, there is no need to convert magnetic north data to true north data. Furthermore, influences such as levelness, temperature, local magnetic field disturbances are unlikely to significantly interfere with the operation of the rate gyros.

Figure 1:
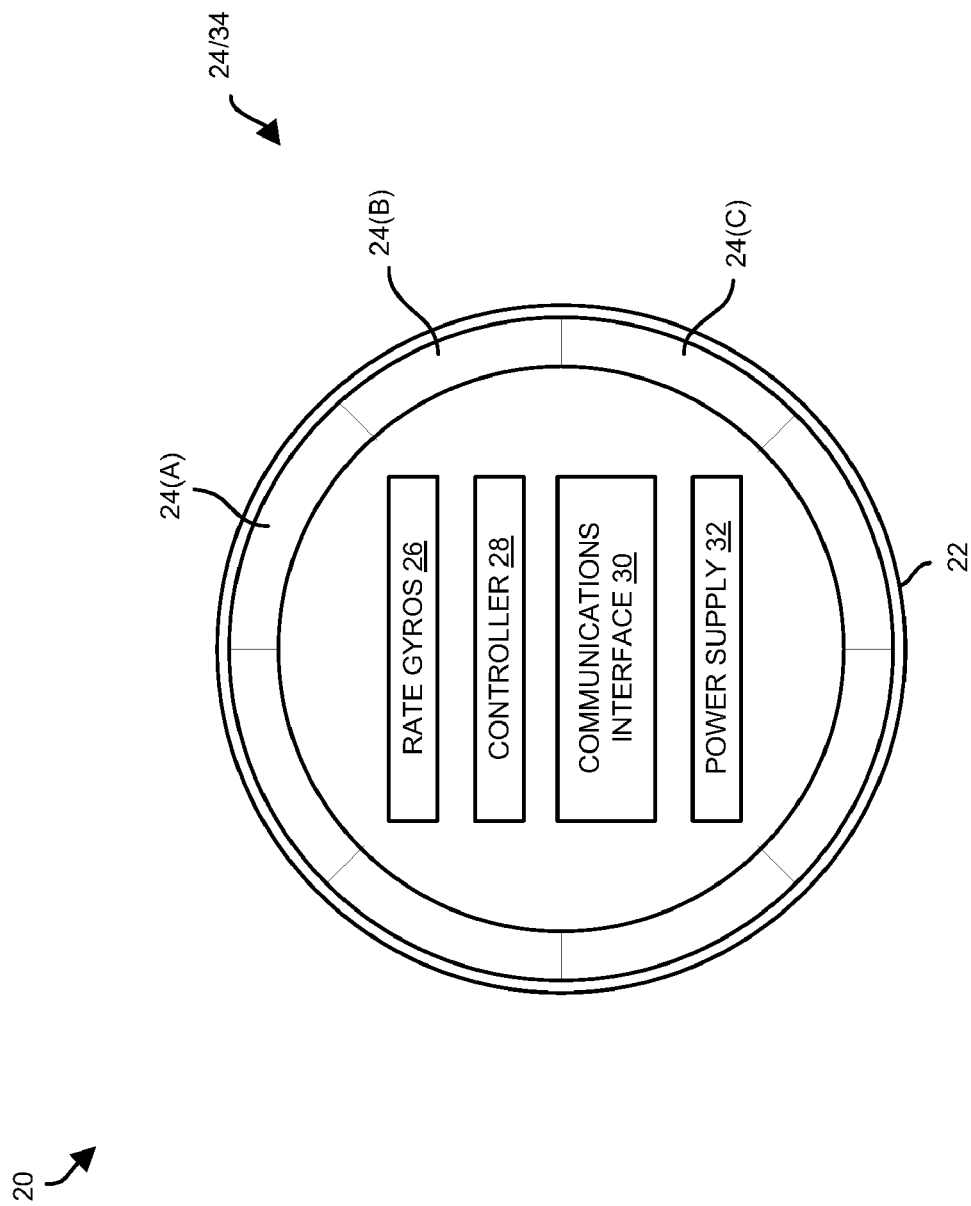
FIG. 1 is a general diagram of a deployable stationary device which utilizes rate gyros to determine true north.

FIG. 1 is a general diagram of a deployable stationary device 20 which carries out angular rate sensing along multiple axes to determine true north. The deployable stationary device 20 includes a device support 22, sensors 24(A), 24(B), 24(C), . . . (collectively sensors 24), multiple rate gyros 26, a controller 28, a communications interface 30, and a power supply 32.

In some arrangements, the device support 22 is a rugged enclosure which robustly and reliably supports the other components (e.g., the sensors 24, the rate gyros 26, the controller 28, etc.) for deployment in the field (e.g., via an air drop, manual installation, via an unmanned vehicle, etc.). Once the deployable stationary device 20 reaches its stationary destination, the device support 22 protects these components from environmental influences at the stationary destination (e.g., against poor whether conditions).

The sensors 24 electrically connect to the power supply 32 for power, and to the controller 28 for data output. The arrangement of the sensors 24 preferably enables the sensors 24 to operate as a sensor array 34 which identifies a particular direction of sensed activity from the device 20. Such sensing can include noise detection, low frequency vibration sensing, heat or infrared sensing, seismic signature sensing, and so on. In some arrangements, the sensors substantially provide circular or spherical 360 degree coverage around the periphery of the device 20.

Similarly, the rate gyros 26 electrically connect to the power supply 32 for power, and to the controller 28 for data output. The arrangement of the rate gyros 26 preferably enables the rate gyros 26 to carryout angular rate sensing along different axes, i.e., each rate gyro 26 provides a respective signal indicating a rate of rotation for the earth about a respective axis associated with that rate gyro 26. In some arrangements, there are three rate gyros 26 arranged to measure rates of rotation around three axes which are substantially orthogonal to each other (the X-axis, the Y-axis, and the Z-axis). In these arrangements, an X-axis rate gyro 26 outputs an X-axis signal indicating a rate of rotation about the X-axis, a Y-axis rate gyro 26 outputs a Y-axis signal indicating a rate of rotation about the Y-axis, and a Z-axis rate gyro 26 outputs a Z-axis signal indicating a rate of rotation about the Z-axis.

Preferably, the rate gyros 26 are relatively small, reliable components within the device 20 which are well-suited for remote deployment in the field. In some arrangements, each rate gyro 26 is a Microelectromechanical Systems (MEMS) technology angular rate sensor. In other arrangements, each rate gyro 26 is a fiber optic technology angular rate sensor. In yet other arrangements, each rate gyro 26 is based on a different technology (e.g., pendulous integrating gyro accelerometers (PIGAs), crystal-based angular rate sensors, classic mechanical, combinations thereof, etc.). It should be understood that multiple rate gyros 26 can be used to sense rotation for each axis, or along different or complementary axes for fault tolerance purposes (e.g., redundant sensing).

The controller 28 electrically connects to the power supply 32 for power, and to the sensors 24 and the rate gyros 26 for data collection. The controller 28 is further electrically connected to the communications interface 30 for remote communications with one or more external devices (e.g., for wireless communications with a base station, for location sensing based on satellite signals from a Global Positioning System, etc.).

During operation, the controller 28 is arranged to receive rate gyro signals from the rate gyros 26. Each rate gyro signal indicates a rate of rotation about a respective axis associated with a particular rate gyro 26. The controller 28 is further arranged to perform a vector sum operation based on the rate gyro signals, and generate a direction signal which identifies a direction resulting from performance of the vector summing operation providing magnitude and direction. Accordingly, the controller 28 is capable of identifying a true north vector from the rate gyro signals which identify measured components of the earth's rotation.

It should be understood that, in the context of a surveillance system, the identified true north vector is capable of being used in conjunction with information provided by the sensors 24 and the communications interface 30 to provide a bearing on sensed activity. Accordingly, multiple deployable stationary device 20 are capable of cooperating (e.g., via triangulation) to provide an accurate ground location of the sensed activity. This feature will be explained in further detail shortly.

It should be further understood that the true north vectoring capabilities of the rate gyros 26 enable the device 20 to operate as a simple, low cost, remotely operational gyroscopic compass. With such a capability, the device 20 is well-suited for identifying the North-South axis of any rotating body (e.g., a moon, an asteroid, an artificial body, etc.). Further details will now be provided with reference to FIG. 2.

Figure 2:
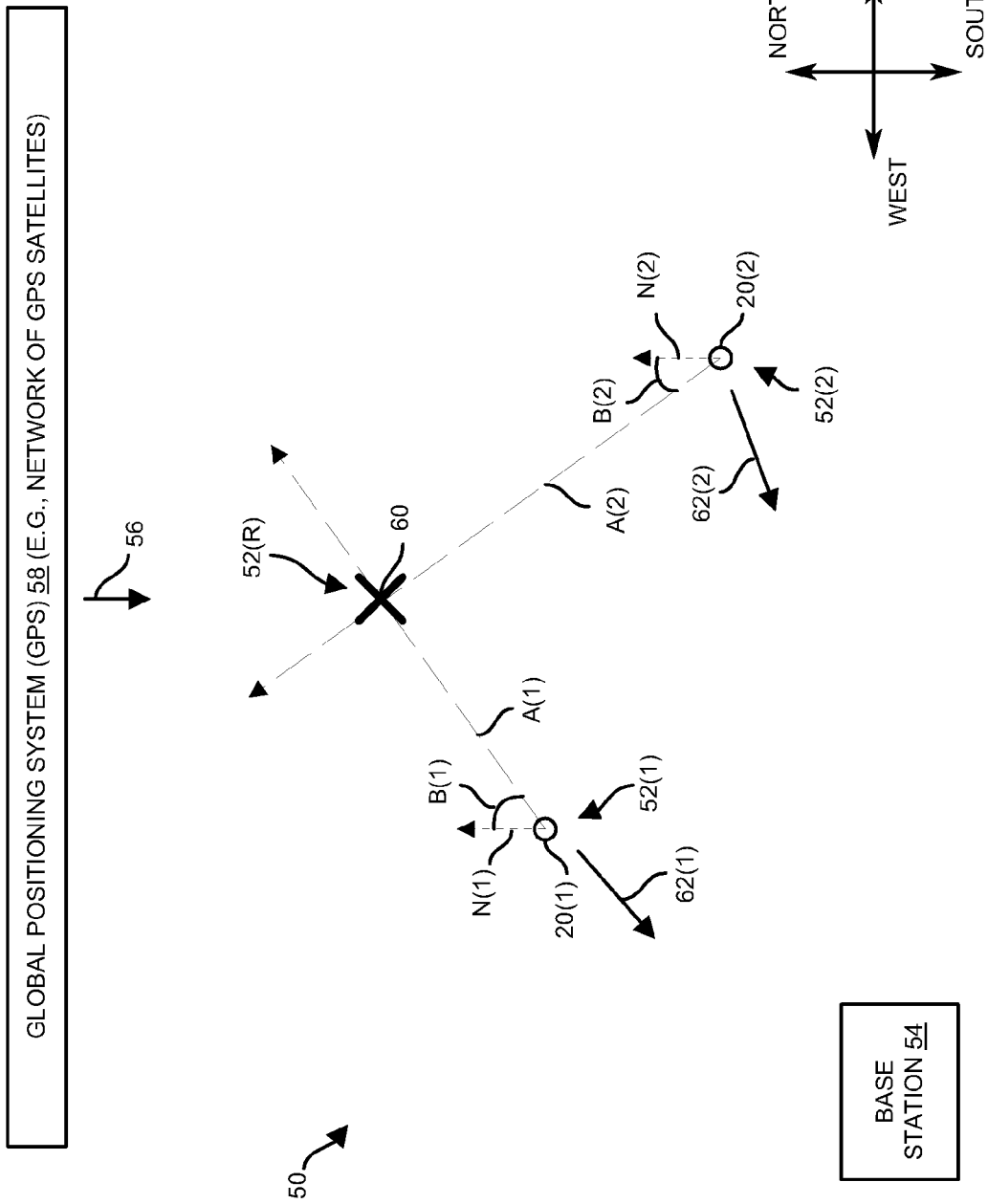
FIG. 2 is a general diagram of a surveillance system which utilizes multiple deployable stationary devices.

FIG. 2 is a general diagram of a surveillance system 50 which utilizes multiple deployable stationary devices 20. As shown in FIG. 2, the surveillance system 50 includes a first deployable stationary device 20(1) disposed at a first field location 52(1), a second deployable stationary device 20(2) disposed at a second field location 52(2), and a base station 54. Each deployable stationary device 20 is capable of determining its respective location in the field based on transmissions 56 from a Global Positioning System (GPS) 58. It should be understood that the surveillance system 50 is capable of including other deployable stationary devices 20 at other field locations for enhanced activity sensing (e.g., to cover a larger area, to obtain additional input for higher precision and/or reliability, etc.).

As further shown in FIG. 2, the controller 28 of the deployable stationary device 20(1) is arranged to detect the true north direction based on the signals from the rate gyros 26 (FIG. 1) of that device 20(1) (see the arrow N(1) in FIG. 2). Similarly, the controller 28 of the deployable stationary device 20(2) is arranged to detect the true north direction N based on the signals from the rate gyros 26 of the device 20(2) (see the arrow N(2) in FIG. 2).

Additionally, the controller 28 of the deployable stationary device 20(1) is arranged to detect activity 60 (e.g., noise, vibration, heat, etc.) at a remote location 52(R) (i.e., a particular location of interest) based on sensor signals from the sensors 24 of that device 20(1) (see the arrow A(1)). The controller 28 of the deployable stationary device 20(1) is arranged to provide a bearing B(1) on the remote location 52(R) from the perspective of the deployable stationary device 20(1). This bearing B(1) (e.g., 45 degrees from true north) is the angular displacement between the determined true north direction N(1) and the sensed direction A(1) of the particular location of interest 60. In addition, elevation information is capable of being sensed (e.g., via the sensors 24) and used to accomplish mission oriented objectives.

Similarly, the controller 28 of the deployable stationary device 20(2) is arranged to detect the same activity 56 at the remote location 52(R) based on sensor signals from the sensors 24 of the device 20(2) (see the arrow A(2)). Next, the controller 28 of the deployable stationary device 20(1) is arranged to provide a bearing B(2) on the remote location 52(R) from the perspective of the deployable stationary device 20(2). The bearing B(2) (e.g., 330 degrees from true north) is the angular displacement between the true north direction N(2) and the sensed direction A(2) of the particular location of interest 60 as determined by the device 20(2).

The deployable stationary device 20(1) is arranged to transmit a device signal 62(1) indicating its location 52(1) and the bearing B(1) of the activity 60 to the base station 54. Also, the deployable stationary device 20(2) is arranged to transmit a device signal 62(2) indicating its location 52(2) and the bearing B(2) of the activity 60 to the base station 54. Once the base station 54 receives this information, the base station 54 is able to locate the activity 60. In particular, the base station 54 is capable of identifying the location 52(R) via triangulation and then take action (e.g., further investigate the activity 60, etc.). Further details will now be provided with reference to FIG. 3.

Figure 3:
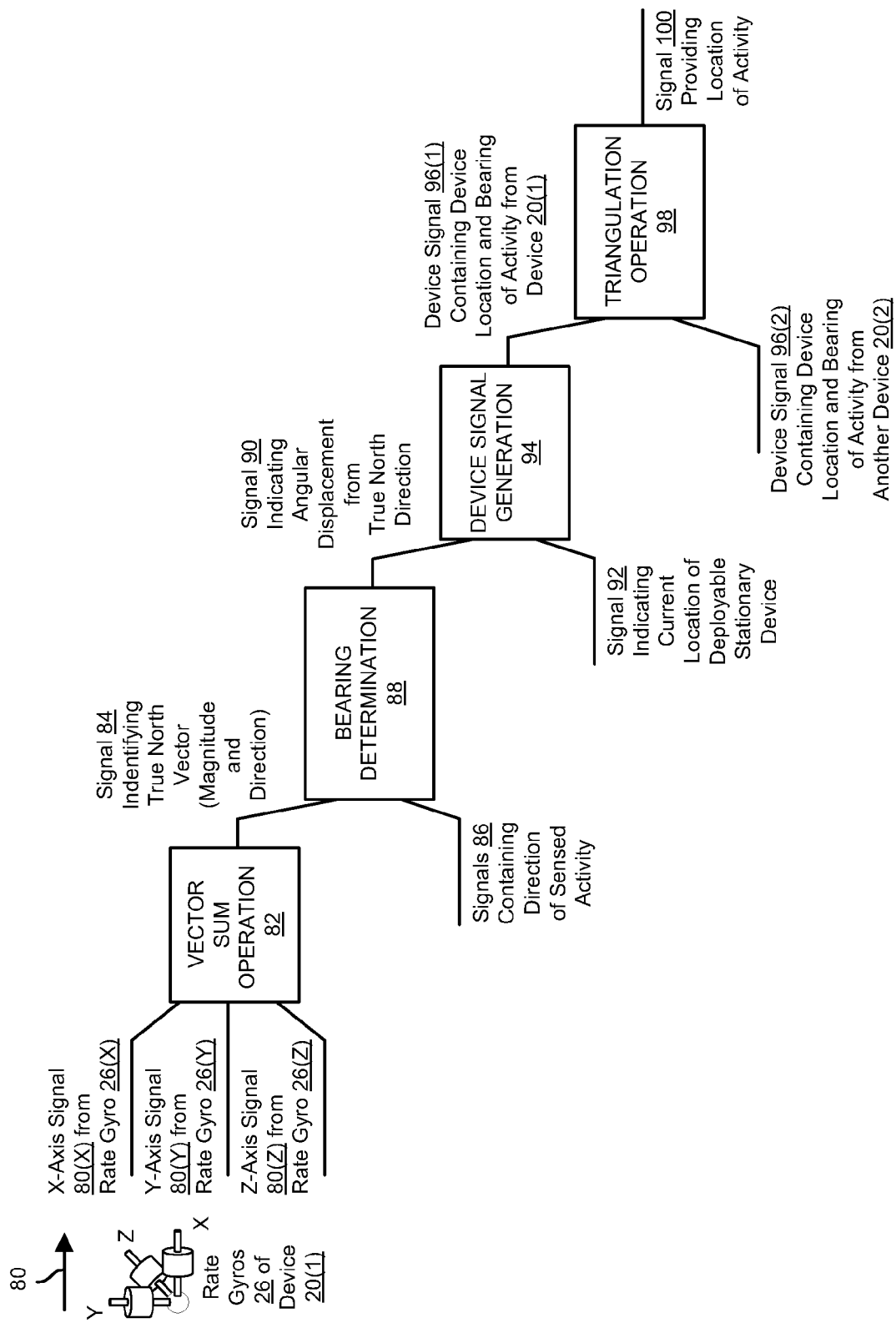
FIG. 3 is a flow diagram illustrating particular operations of the surveillance system of FIG. 2.

FIG. 3 is a diagram illustrating how various operations, which are carried out by components of the surveillance system 50, provide a particular result. As shown, the rate gyros 26 of a particular deployable stationary device 20(1) output a set of rate gyro signals 80. In particular, the X-axis rate gyro 26(X) provides an X-axis signal 80(X) indicating a rate of rotation about the X-axis, a Y-axis rate gyro 26(Y) outputs a Y-axis signal 80(Y) indicating a rate of rotation about the Y-axis, and a Z-axis rate gyro 26 outputs a Z-axis signal 80(Z) indicating a rate of rotation about the Z-axis, where the X, Y and Z axes are orthogonal to each other. As mentioned earlier, a variety of angular rate sensors are suitable for use as the rate gyros 26 such as MEMS-based components, fiber optic components, and crystal-based components.

The controller 28 of the deployable stationary device 20(1) performs a vector sum operation 82 and generates a direction signal 84 which identifies a directional reference with respect to the particular deployable stationary device 20(1). When the device 20(1) is deployed on the earth, the direction signal 84 indicates the true north direction, i.e., the North-South earth axis, relative to the device 20(1).

The controller 28 further monitors the outputs of the sensors 24 which are arranged to detect activity around the device 20(1). In particular, the controller 28 receives a set of sensor output signals 86 and identifies activities 60 relative to the device 20(1) based on the set of sensor output signals 86 (also see the particular location of interest 60 in FIG. 2). The controller 28 is arranged to identify a direction of activity (e.g., a direction of a particular noise, vibration, etc.) based on the set of sensor output signals 86.

Once the controller 28 of the deployable stationary device 20(1) has both the true north vector and a vector to the particular location of interest 60, the controller 28 performs a bearing determination operation 88. The result 90 of this operation 88 is a signal 90 which is an angle from the true north direction (also see the angles A(1) and A(2) in FIG. 2).

The controller 28 also knows of the location of the device 20(1) from a signal 92. In some arrangements, the controller 28 is equipped with GPS circuitry to enable the controller 28 to determine its location and then generate the signal 92, based on GPS signals (also see the GPS signals 56 in FIG. 2). In other arrangements, the controller 28 obtains location information in a different manner (e.g., manually from a field technician, remotely via remote communications, etc.).

At this point, it should be understood that the device 20(1) knows its current location and has a bearing on the activity of interest. Accordingly, the device 20(1) performs an operation 94 which generates a device signal 96(1) containing this information and transmits the device signal 96(1) to an external device (e.g., see the device signals 62(1), 62(2) which are sent to the base station 54 in FIG. 2).

The external device receives the device signal 96(1) and similar signals from other deployable stationary devices 20. As shown in FIG. 3, another device signal 96(2) is available from another device 20(2). The device signal 96(2) includes the current location of the device 20(2) and a bearing on the activity of interest from the perspective of the device 20(2). The external device then performs a triangulation operation 98 (perhaps further based on other device signals) and outputs a signal 100 which precisely identifies the location of the sensed activity. Accordingly, a user of the external device is now capable of acting on the location identified by the signal 100. Further details will now be provided with reference to FIG. 4.

Figure 4:
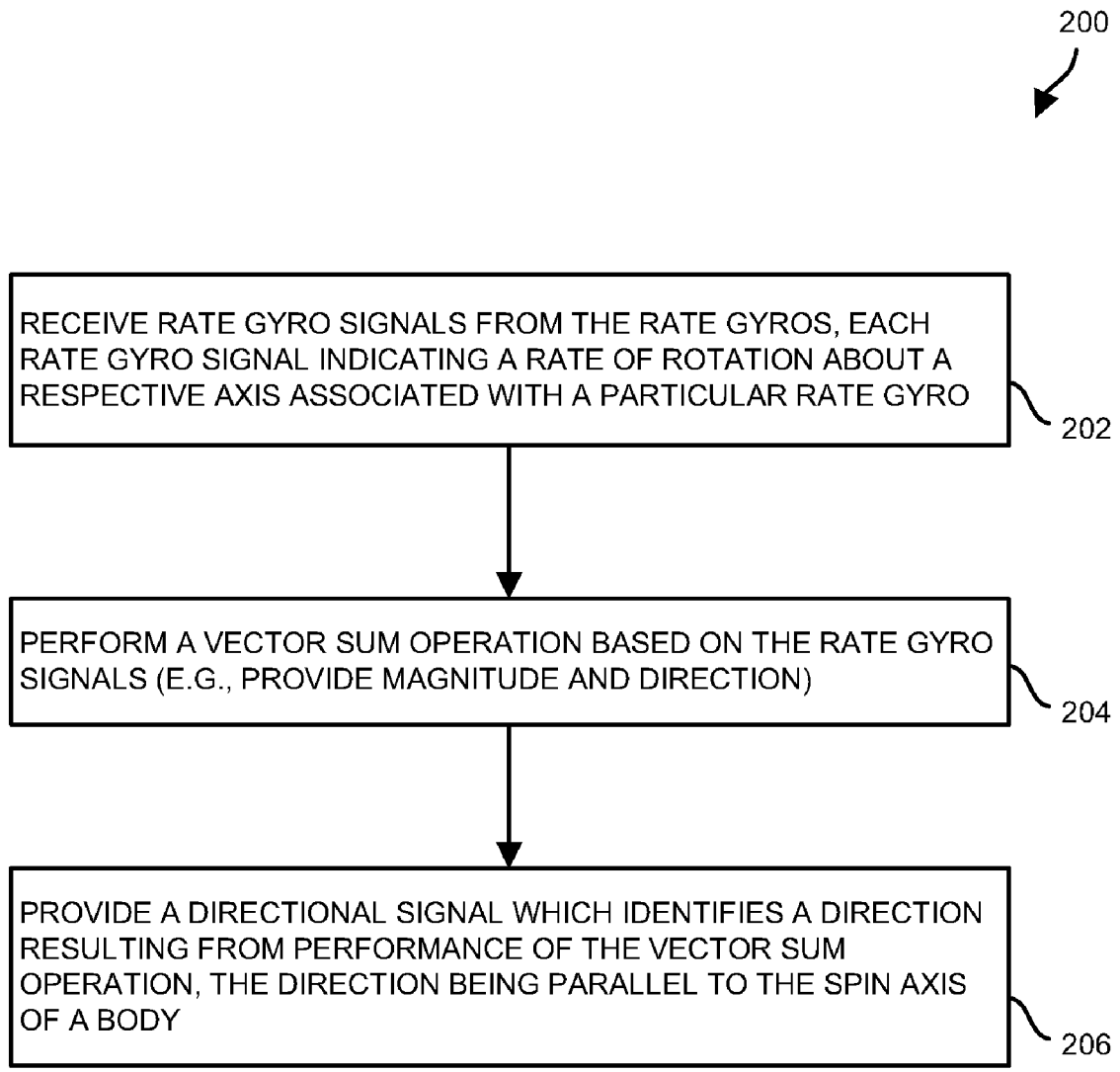
FIG. 4 is a flowchart of a procedure performed by the deployable stationary device of FIG. 1.

FIG. 4 is a flowchart of a procedure 200 which is performed by the controller 28 of a deployable stationary device 20 to identify a direction reference (e.g., true north). In step 202, the controller 28 receives rate gyro signals 80 from the rate gyros 26. Each rate gyro signal 80 indicates a rate of rotation about a respective axis (e.g., the X-axis, the Y-axis, the Z-axis) associated with a particular rate gyro 26 (also see FIG. 3).

In step 204, the controller 28 performs a vector sum operation 82 (FIG. 3) based on the rate gyro signals 80. The vector sum operation 82 provides a magnitude and direction based on the rate gyro signals 80.

In step 206, the controller 28 provides a direction signal 84 (FIG. 3) which identifies a direction resulting from performance of the vector sum operation 82. In the context of a stationary position on earth, the identified direction is parallel to the earth's spin axis, i.e., the North-South axis. In the context of a stationary location on a non-earth body (e.g., a moon, an asteroid, an artificial object), the outputted vector is parallel to the spin axis of that body.

As described above, an improved technique of identifying a directional reference utilizes rate gyros 26. The angular rate sensing capabilities of rate gyros 26 generally make the rate gyros 26 insensitive to levelness and magnetic interference. Rather, the rate gyros 26 provide signals along particular sensing axes (X, Y, and Z axes) which, when vector summed, enable identification of the earth's true north direction. Accordingly, there is no need to convert magnetic north data to true north data. Furthermore, influences such as levelness, temperature, local magnetic field disturbances are unlikely to significantly interfere with the operation of the rate gyros 26.

While various embodiments of the invention have been particularly shown and described, it will be understood by those skilled in the art that various changes in form and details may be made therein without departing from the spirit and scope of the invention as defined by the appended claims.

For example, the device 20 was described above as belonging to a surveillance system 20 and being configured to provide a bearing on sensed activity from a stationary location by way of example only. In other arrangements, the rate gyros 26 combine with circuitry of the controller 28 to provide an electronic gyroscopic compass which is capable of identifying the North-South axis of a rotating body (e.g., a moon, an asteroid, an artificial body, etc.). In general, such an electronic gyroscopic compass is capable of being implemented as an advantageously simple, inexpensive, remotely operational device (e.g., the compass of a probe). Moreover, the angular rate sensing aspects of such an electronic gyroscopic compass makes the electronic gyroscopic compass resistant to influences that adversely affect conventional electronic magnetic compasses (e.g., susceptibility to temperature and magnetic interference, sensitivity to levelness, and so on).

Additionally, it should be understood that the above-described angular rate sensing features are capable of being employed on stationary platforms that perform a particular function. For example, these features are capable of being used to take a picture or deploy a device or weapon based on bearing versus the platform orientation. Such modifications, enhancements and uses are intended to belong to particular embodiments of the invention.

What is claimed is:

1. A surveillance system, comprising:
 a set of deployable stationary devices, each deployable stationary device including (i) a device support, (ii) rate gyros supported by the device support, the rate gyros being oriented along different axes, and (iii) a controller supported by the device support, the controller being arranged to:
  receive rate gyro signals from the rate gyros, each rate gyro signal indicating a rate of rotation about a respective axis associated with a particular rate gyro, perform a vector sum operation based on the rate gyro signals, and
  generate a direction signal which identifies a direction resulting from performance of the vector sum operation; and
 a base station arranged to (i) acquire, from each deployable stationary device, a device signal which includes the direction signal generated by the controller of that deployable stationary device, and (ii) identify a location of interest based on the device signal from each deployable stationary device.

2. A surveillance system as in claim 1 wherein the different axes include an X-axis, a Y-axis, and a Z-axis;
 wherein the X-axis, the Y-axis, and the Z-axis are substantially orthogonal to each other; and
 wherein the controller of each deployable stationary device, when receiving the rate gyro signals from the rate gyros, is arranged to obtain (i) an X-axis signal indicating a rate of rotation about the X-axis, (ii) a Y-axis signal indicating a rate of rotation about the Y-axis, and (iii) a Z-axis signal indicating a rate of rotation about the Z-axis.

3. A surveillance system as in claim 2 wherein the controller of each deployable stationary device, when generating the direction signal which identifies the direction resulting from performance of the vector summing operation, is arranged to:
 provide a True North vector signal which identifies a direction of the North-South earth axis relative to that deployable stationary device.

4. A surveillance system as in claim 3 wherein, for each deployable stationary device:
 that deployable stationary device further includes a sensor supported by the device support of that deployable stationary device, the sensor being arranged to output a sensor signal; and
 the controller of that deployable stationary device is further arranged to output a respective device signal based on (i) the direction signal identifying the direction resulting from performance of the vector summing operation and (ii) the sensor signal.

5. A surveillance system as in claim 4 wherein the device signal outputted by the controller of each deployable stationary device identifies a bearing of a particular location of interest, the bearing being an angular displacement between the particular location of interest and the North-South earth axis.

6. A surveillance system as in claim 5 wherein the device signal outputted by the controller of each deployable stationary device further identifies a location of the deployable stationary device identified via a Global Positioning System (GPS).

7. A surveillance system as in claim 5 wherein the base station is arranged to communicate wirelessly with a first deployable stationary device when the first deployable stationary device resides at a first ground location and a second deployable stationary device when the second deployable stationary device resides at a second ground location which is distal from the first ground location.

8. A surveillance system as in claim 5 wherein each rate gyro is a Microelectromechanical Systems (MEMS) technology angular rate sensor.

9. A surveillance system as in claim 5 wherein each rate gyro is a fiber optic technology angular rate sensor.

10. A deployable stationary device, comprising:
 a device support;
 rate gyros supported by the device support, the rate gyros being oriented along different axes; and
 a controller supported by the device support, the controller being arranged to:
  receive rate gyro signals from the rate gyros, each rate gyro signal indicating a rate of rotation about a respective axis associated with a particular rate gyro, perform a vector sum operation based on the rate gyro signals, and
  generate a direction signal which identifies a direction resulting from performance of the vector sum operation.

11. A deployable stationary device as in claim 10 wherein the different axes include an X-axis, a Y-axis, and a Z-axis;
 wherein the X-axis, the Y-axis, and the Z-axis are substantially orthogonal to each other; and
 wherein the controller, when receiving the rate gyro signals from the rate gyros, is arranged to obtain (i) an X-axis signal indicating a rate of rotation about the X-axis, (ii) a Y-axis signal indicating a rate of rotation about the Y-axis, and (iii) a Z-axis signal indicating a rate of rotation about the Z-axis.

12. A deployable stationary device as in claim 11 wherein the controller, when generating the direction signal which identifies the direction resulting from performance of the vector summing operation, is arranged to:
 provide a True North vector signal which identifies a direction of the North-South earth axis relative to the deployable stationary device.

13. A deployable stationary device as in claim 12, further comprising a sensor supported by the device support, the sensor being arranged to output a sensor signal; and
 wherein the controller is further arranged to output a device signal based on (i) the direction signal identifying the direction resulting from performance of the vector summing operation and (ii) the sensor signal.

14. A deployable stationary device as in claim 13 wherein the device signal identifies a bearing of a particular location of interest, the bearing being an angular displacement between the particular location of interest and the North-South earth axis.

15. A deployable stationary device as in claim 14 wherein the device signal further identifies a location of the deployable stationary device identified via a Global Positioning System (GPS).

16. A deployable stationary device as in claim 14 wherein each rate gyro is a Microelectromechanical Systems (MEMS) technology angular rate sensor.

17. A deployable stationary device as in claim 14 wherein each rate gyro is a fiber optic technology angular rate sensor.

18. In a deployable stationary device having rate gyros oriented along different axes, a method of identifying a directional reference, the method comprising:
 receiving rate gyro signals from the rate gyros, each rate gyro signal indicating a rate of rotation about a respective axis associated with a particular rate gyro;
 performing a vector sum operation based on the rate gyro signals; and providing a direction signal which identifies a direction resulting from performance of the vector sum operation.

19. A method as in claim 18 wherein the different axes include an X-axis, a Y-axis, and a Z-axis;
   wherein the X-axis, the Y-axis, and the Z-axis are substantially orthogonal to each other; and
   wherein receiving the rate gyro signals from the rate gyros includes obtaining (i) an X-axis signal indicating a rate of rotation about the X-axis, (ii) a Y-axis signal indicating a rate of rotation about the Y-axis, and (iii) a Z-axis signal indicating a rate of rotation about the Z-axis.

20. A method as in claim 19 wherein providing the direction signal which identifies the direction resulting from performance of the vector summing operation includes:
   generating a True North vector signal which identifies a direction of the North-South earth axis relative to the deployable stationary device.

* * * * *